(12) United States Patent
Maher, Jr.

(10) Patent No.: US 6,409,149 B1
(45) Date of Patent: Jun. 25, 2002

(54) DUAL PENDULUM VALVE ASSEMBLY WITH VALVE SEAT COVER

(75) Inventor: Joseph Ashurst Maher, Jr., Wenham, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/612,812

(22) Filed: Jul. 10, 2000

Related U.S. Application Data

(63) Continuation-in-part of application No. 09/606,382, filed on Jun. 28, 2000, now Pat. No. 6,328,051.

(51) Int. Cl.[7] .................................................. F16K 3/06
(52) U.S. Cl. ....................... 251/328; 251/215; 251/187; 251/301
(58) Field of Search .......................... 137/613; 251/328, 251/329, 301, 298, 356, 203, 215, 187, 229

(56) References Cited

U.S. PATENT DOCUMENTS

| 2,031,151 | A | * | 2/1936 | Eulberg .................. 251/326 X |
|---|---|---|---|---|
| 2,749,082 | A | | 6/1956 | Allen |
| 2,850,260 | A | | 9/1958 | Perazone et al. |
| 3,120,944 | A | | 2/1964 | Cogez et al. |
| 3,557,822 | A | | 1/1971 | Chronister |
| 3,722,857 | A | | 3/1973 | Townsend |
| 3,854,696 | A | | 12/1974 | Keyes et al. |
| 3,973,753 | A | | 8/1976 | Wheeler |
| 4,044,993 | A | | 8/1977 | Wheeler |
| 4,052,036 | A | | 10/1977 | Schertler |
| 4,073,468 | A | | 2/1978 | Erwin |
| 4,088,301 | A | | 5/1978 | Ehmig |
| 4,089,505 | A | | 5/1978 | Anderle et al. |
| 4,136,854 | A | | 1/1979 | Ehmig et al. |
| 4,219,183 | A | | 8/1980 | Hoffmann et al. |
| 4,333,631 | A | | 6/1982 | Bosch |
| 4,395,049 | A | | 7/1983 | Schertler |
| 4,442,996 | A | | 4/1984 | Erwin |
| 4,458,905 | A | | 7/1984 | Bosch |

(List continued on next page.)

FOREIGN PATENT DOCUMENTS

| DE | 1190755 | 4/1965 |
|---|---|---|
| GB | 786378 | 11/1957 |
| GB | 825554 | 12/1959 |
| GB | 1050435 | 12/1966 |
| GB | 1111281 | 4/1968 |

OTHER PUBLICATIONS

PCT International Search Report dated Dec. 20, 2001; 3 pages PCT/US01/20434.

*Primary Examiner*—Kevin Lee
(74) *Attorney, Agent, or Firm*—McDermott, Will & Emery

(57) ABSTRACT

A dual pendulum valve assembly for connecting a process chamber and a vacuum pump of a semiconductor manufacturing system. The valve assembly includes an isolation valve for sealing an opening to the pump during cleaning of the system and an annular cover for protecting a valve seat of the opening to the pump during use of the system. In particular, the valve assembly includes a housing having an interior space and a pair of openings through which fluid can enter and exit the interior space. A process valve is movable within the interior space between an opened position allowing fluid to pass through a first of the openings from the process chamber and a closed position sealing the first opening. The isolation valve is movable within the interior space between an opened position allowing fluid to pass through a second of the openings into the vacuum pump and a closed position sealing the second opening. The annular cover is movable within the interior space between a first position wherein the cover protects the valve seat of the second opening and a second position wherein the cover is spaced from the valve seat such that the isolation valve can engage the valve seat and seal the second opening.

19 Claims, 6 Drawing Sheets

U.S. PATENT DOCUMENTS

| | | | |
|---|---|---|---|
| 4,519,578 A | | 5/1985 | Boeckman et al. |
| 4,627,567 A | | 12/1986 | Thorn |
| 4,785,844 A | | 11/1988 | Pankov |
| 4,921,213 A | | 5/1990 | Geiser |
| 4,949,939 A | * | 8/1990 | Almada ...................... 251/328 |
| 5,020,775 A | * | 6/1991 | Iwasaki et al. ............. 251/215 |
| 5,120,019 A | | 6/1992 | Davis, Jr. |
| 5,314,164 A | | 5/1994 | Smith |
| 5,330,157 A | | 7/1994 | Dern et al. |
| 5,379,983 A | | 1/1995 | Geiser |
| 5,577,707 A | | 11/1996 | Brida |
| 5,873,562 A | | 2/1999 | Marugg |
| 6,089,537 A | * | 7/2000 | Olmsted ................. 251/203 X |

* cited by examiner

DUAL PENDULUM VALVE ASSEMBLY WITH VALVE SEAT COVER

CROSS REFERENCE TO RELATED APPLICATIONS

This application is a continuation in part of U.S. patent application Ser. No. 09/606,382 filed, Jun. 28, 2000 U.S. Pat. No. 6,328,051, and entitled "Dual Pendulum Valve Assembly", the disclosure of which is hereby incorporated by reference into this application.

FIELD OF DISCLOSURE

The present disclosure relates to gate valve assemblies, and more particularly to a dual pendulum valve assembly comprising a process chamber isolation valve and a vacuum pump isolation valve. The vacuum pump isolation valve is useful for isolating a vacuum pump coupled to the pendulum valve assembly so that the vacuum pump is not exposed to the atmosphere during cleaning of the pendulum valve assembly and process chamber. Even more particularly, the present disclosure relates to a dual pendulum valve assembly further comprising an annular cover for protecting a valve seat of the pump isolation valve between cleanings.

BACKGROUND OF DISCLOSURE

A pendulum valve assembly generally includes a housing containing a pendulum valve and including an interior space and a pair of openings through which gaseous fluid can enter and exit the interior space. As its name implies, a pendulum valve pivots between open and closed positions, and includes a valve body, which is usually provided as a disk, connected to a rotatably shaft by a pivot arm. In an opened position, the disk of the pendulum valve is moved out of the flow path defined by the openings so that fluid can enter and exit the interior space of the housing, while in a closed position the disk is moved into sealing contact with a valve seat surrounding one of the openings so that fluid can not enter the interior space.

The movement of the disk usually requires pivotal or rotational movement between a first angular position equal to the opened position and a second angular position, and then at least some translational movement from the second angular position into the closed position where the disk is in sealing contact with the valve seat. In order to obtain this combination of rotational and translational movement, prior pendulum valves have typically used multiple actuator elements which are inherently difficult to effect precise movement of the disk, and therefore more difficult to utilize for precise flow control purposes. For examples of such prior pendulum valves see the following: U.S. Pat. Nos. 2,850,260; 3,557,822; 3,722,857; 3,973,753; 4,052,036; 4,089,505; 4,333,631; 4,627,567; 4,785,844; 5,577,707; 5,873,562; British Patent No. 1,050,435 and German Patent 1,190,755. Other valve structures are shown in U.S. Pat. Nos. 2,749,082; 3,854,696; 4,073,468; 4,088,301; 4,135,854; 4,395,049; 4,442,996; 4,458,905; 4,519,578; 4,921,213; 5,379,983; and 5,330,157.

U.S. patent application Ser. No. 09/339,084 discloses an improved pendulum valve assembly that is designed and constructed so as to eliminate the need for multiple actuator mechanisms. Instead, the improved pendulum valve assembly uses a simple rotating cam mechanism that precisely controls the rotational and axial movement of the valve body between an opened position and a closed position.

Pendulum valves are particularly useful in high purity gas delivery systems, such as those used in semiconductor manufacturing or other thin film coating processes performed at very low pressures (high vacuums), e.g., a pressure on the order of one torr or less. One ultra-high vacuum system adapted to operate at low conductances includes a vacuum pump separated from a process chamber by a pendulum valve, which helps control the pressure created in the process chamber by the vacuum pump within a predetermined range.

The process chamber of high purity gas delivery systems normally require cleaning after a given period of use. Such cleaning involves a physical scrubbing of the chamber surfaces and associated vacuum components, such as the pendulum valve that isolates the process chamber.

When the pendulum valve is cleaned it is necessary to shut down the vacuum pump and vent the entire system to atmosphere. Since the vacuum pump contains residues from the process conducted within the process chamber, venting to atmosphere exposes these residues to water vapor and other contaminants that may react with the residues to produce a corrosive agent that can lead to corrosion and premature failure of the vacuum pump. For example, using boron trichloride ($BCl_3$) to etch an aluminum layer produces a residue of aluminum trichloride ($AlCl_3$). When the aluminum trichloride residue reacts with water vapor in the atmosphere, an extremely corrosive hydrochloric acid (HCl) is produced.

As is known, such vacuum pumps are very expensive and difficult to replace. Accordingly there is a need for a device or means for isolating the vacuum pump from the atmosphere during cleaning of the process chamber and the pendulum valve.

SUMMARY OF DISCLOSURE

In accordance with the present disclosure, a dual pendulum valve assembly for connecting a process chamber and a vacuum pump of a semiconductor manufacturing system is provided. The valve assembly includes an isolation valve for sealing an opening to the pump during cleaning of the system and an annular cover for protecting a valve seat of the opening to the pump during use of the system. In particular, the valve assembly includes a housing having an interior space and a pair of openings through which fluid can enter and exit the interior space. A process valve is movable within the interior space between an opened position allowing fluid to pass through a first of the openings from the process chamber and a closed position sealing the first opening. The isolation valve is movable within the interior space between an opened position allowing fluid to pass through a second of the openings into the vacuum pump and a closed position sealing the second opening.

The annular cover is movable within the interior space between a first position wherein the cover protects the valve seat of the second opening and a second position wherein the cover is spaced from the valve seat such that the isolation valve can engage the valve seat and seal the second opening. Preferably, an outer periphery of the annular cover is larger than an outer periphery of the isolation valve, and an inner periphery of the annular cover is smaller than an inner periphery of the opening to the pump.

DETAILED DESCRIPTION OF DISCLOSURE

Figure 1:
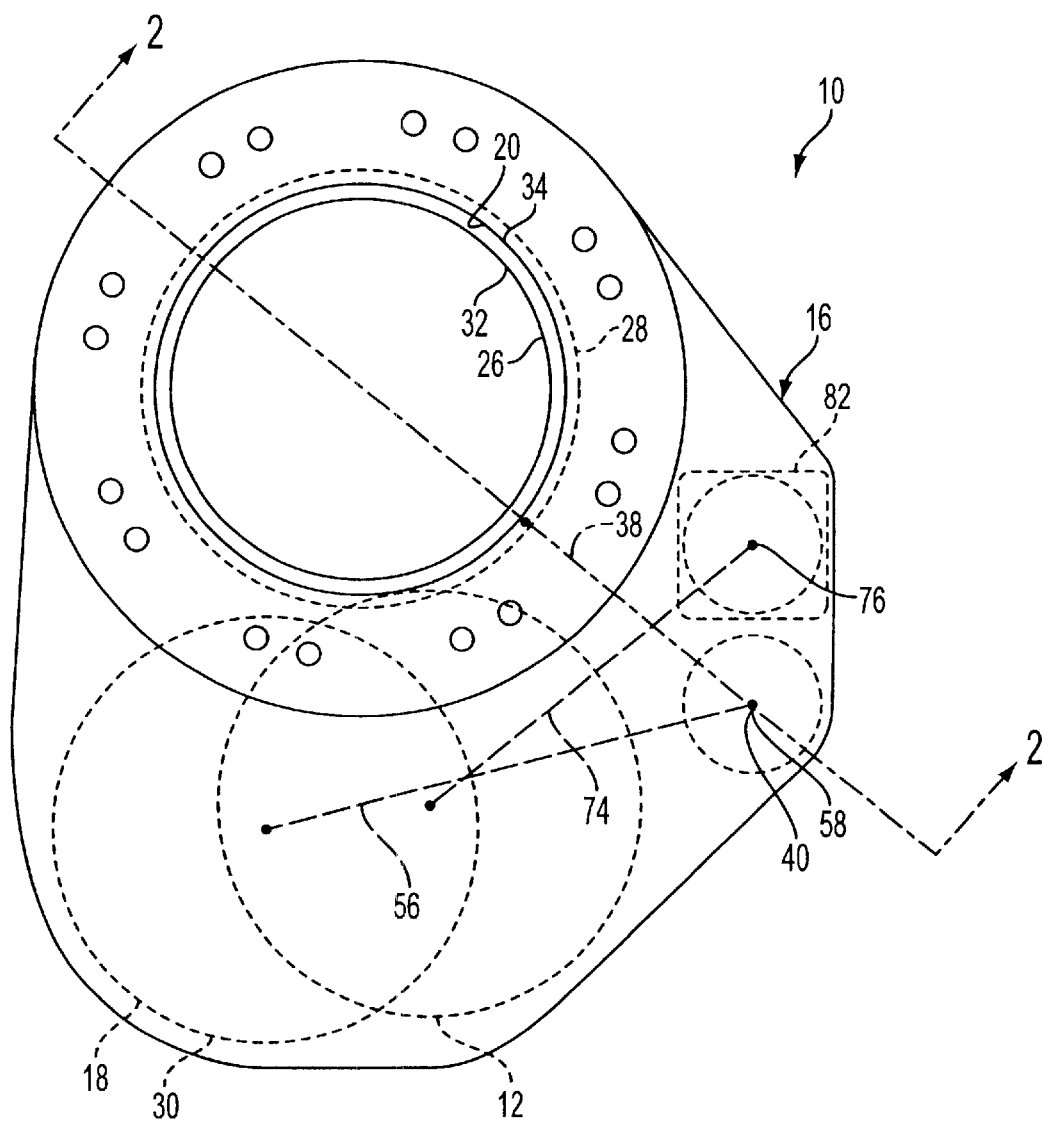
FIG. 1 is a plan view of a valve assembly according to the present disclosure, wherein two pendulum valves are shown in open positions and a valve seat cover of the assembly is shown deployed.

Referring to FIGS. 1 through 6, a dual pendulum valve assembly 10 constructed in accordance with the present disclosure is shown. The valve assembly 10 is for connecting a process chamber and a vacuum pump of a high purity gas delivery system, such as those used in semiconductor manufacturing or other thin film coating processes performed at very low pressures (high vacuums).

The valve assembly 10 includes a first valve body, which can be used as process chamber isolation valve 12, for closing a first opening 14 of a housing 16 of the valve, which can be connected to a process chamber. The process chamber isolation valve 12 engages a valve seat 24 of the first opening 14 and seals the first opening to control pressure within the process chamber. The valve assembly 10 also includes a second valve body, which can be used as a pump isolation valve 18, for sealing a second opening 20 of the housing 16, which can be connected to a vacuum pump. The pump isolation valve 18 engages a valve seat 22 of the second opening 20 and seals the second opening to prevent process residues within the pump from reacting with ambient air during cleaning of the process chamber and valve assembly 10.

The valve assembly 10 further includes an annular cover 26 for protecting the valve seat 22 of the second opening 20 from residues during operation of the process chamber, when the pump isolation valve 18 is not in use and moved away from the second opening 20. The annular cover 26 is movable within the housing 16 between a first position and a second position. In the first position, shown in FIG. 2, the cover 26 engages and protects the valve seat 22 of the second opening 20. In the second position, shown in FIG. 6, the cover 26 is spaced from the valve seat 22 such that the pump isolation valve 18 can be moved between the cover 26 and the second opening 20 and engage the valve seat 22 and seal the second opening 20.

Preferably, an outer periphery 28 of the annular cover 26 is larger than an outer periphery 30 of the pump isolation valve 18, and an inner periphery 32 of the annular cover 26 is smaller than an inner periphery 34 of the second opening 20. In this manner, the annular cover 26 will protect at least the entire valve seat 22 from process residues between cleanings of the valve assembly 10.

Figure 2:
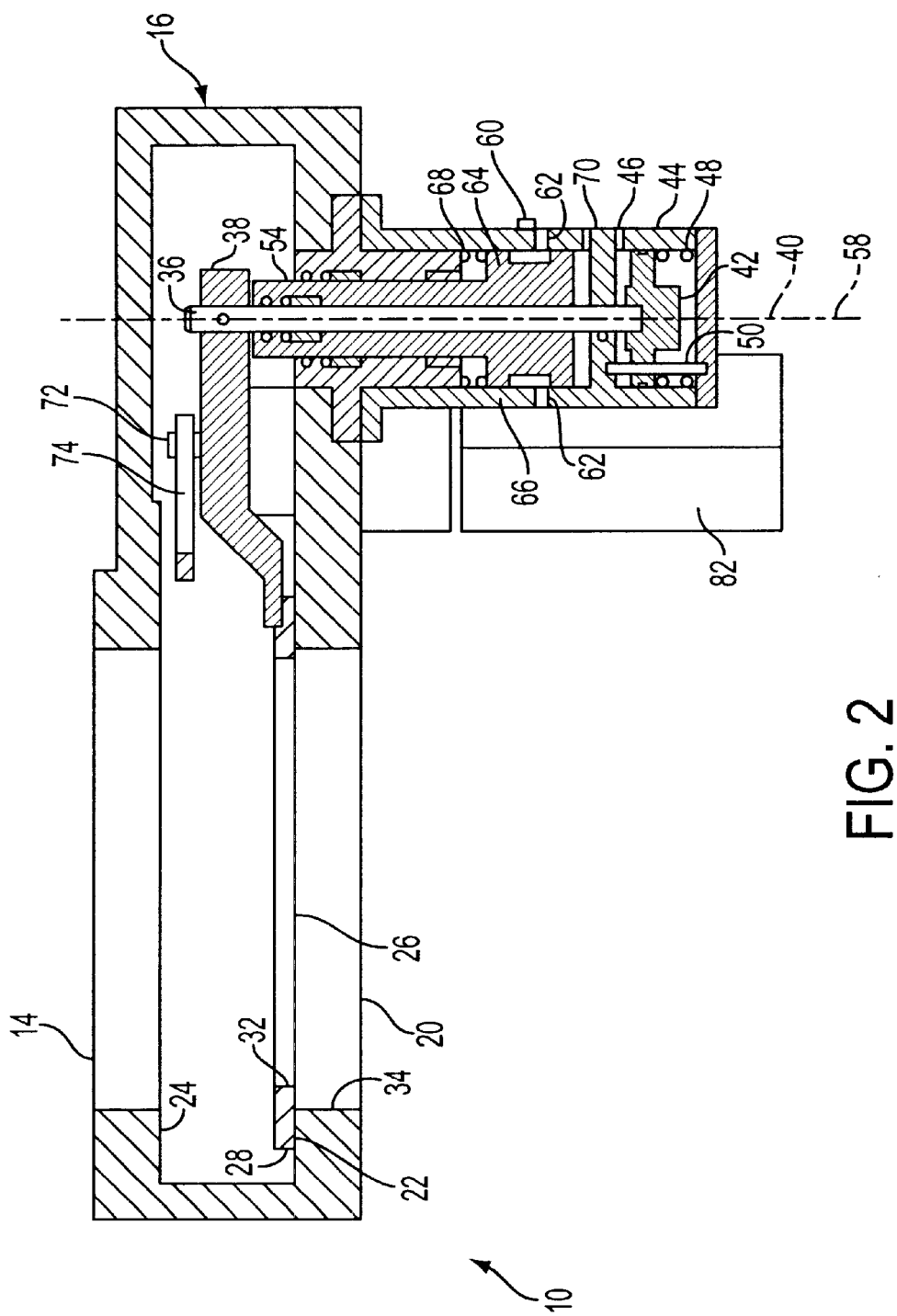
FIG. 2 is a sectional view of the pendulum valve assembly taken along line 2—2 of FIG. 1.
Figure 3:
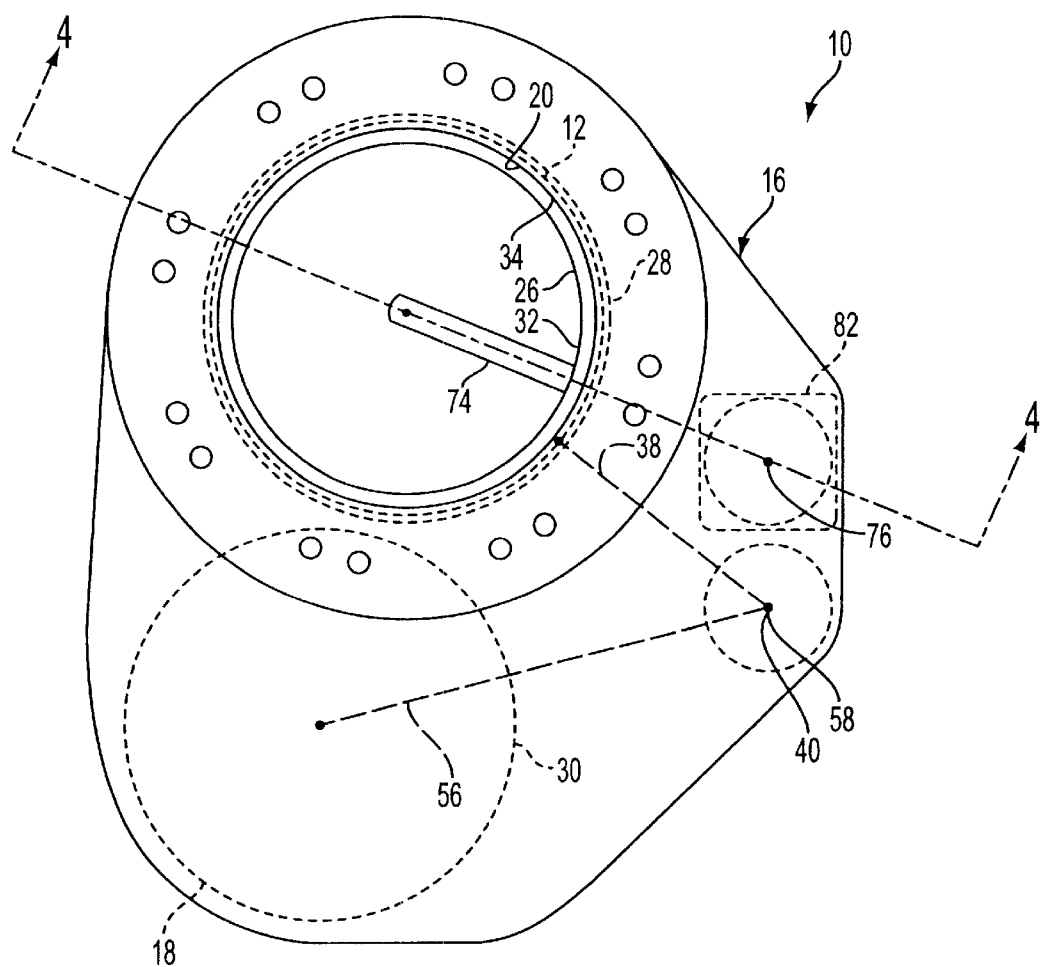
FIG. 3 is a plan view of the pendulum valve assembly of FIG. 1, wherein one of the pendulum valves is shown in a closed position.
Figure 6:
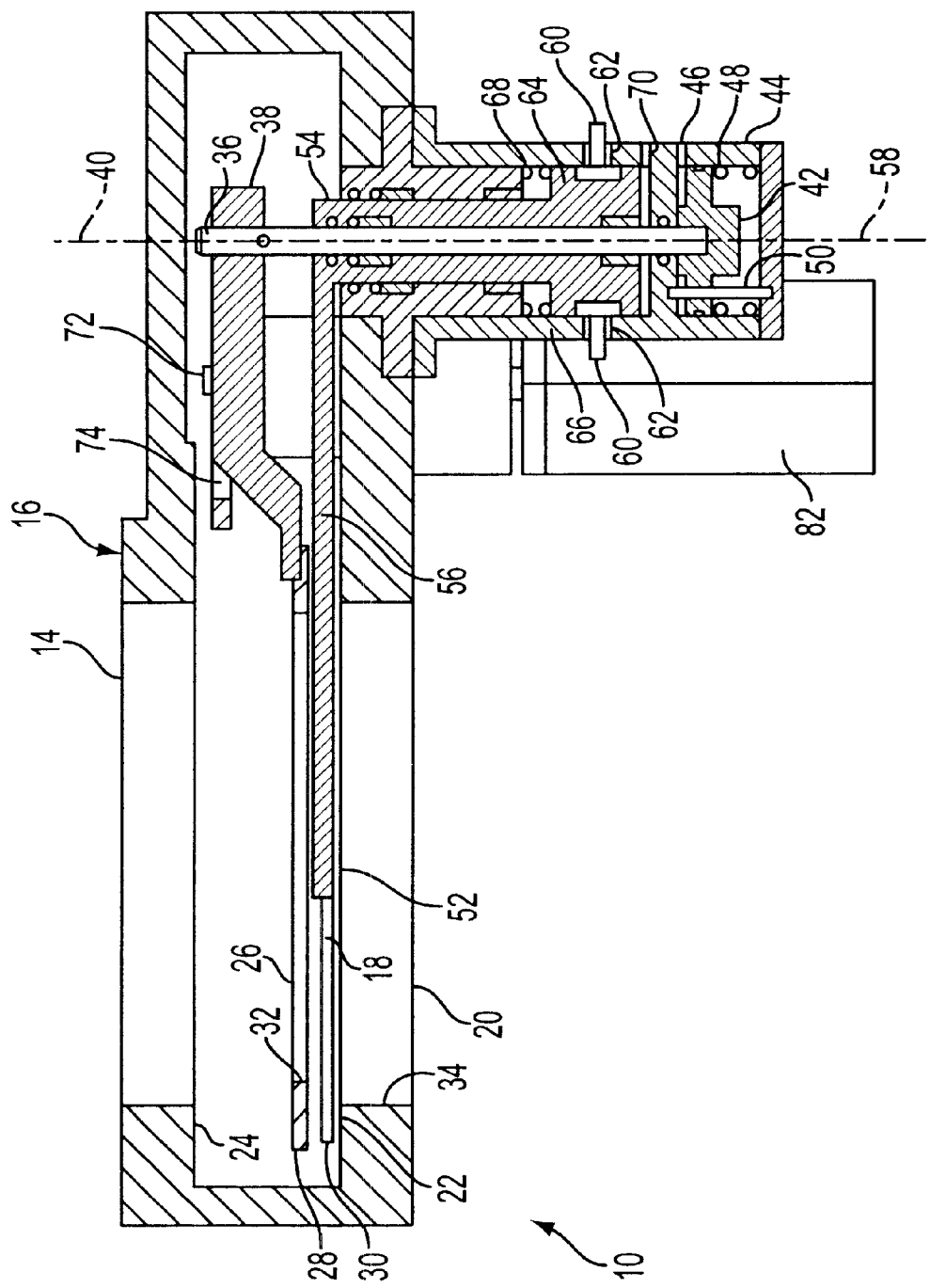
FIG. 6 is a sectional view of the pendulum valve assembly taken along line 6—6 of FIG. 3.

Referring to FIGS. 2 and 6, in the particular embodiment shown the annular cover 26 is connected to a shaft 36 through an arm 38 radially extending from the shaft. The shaft 36 is mounted within the housing 16 of the assembly 10 so as to be movable axially along its longitudinal axis 40. A pneumatic piston 42 is connected to the shaft 36 and slidably contained in a cylinder 44 of the housing 16. A port 46 is provided in the cylinder for receiving pressurized gas to force the piston 42 and the shaft 36 in an axial direction and move the annular cover 26 to the first position engaging and protecting the valve seat 22, as shown in FIG. 2.

In addition, a spring 48 is provided in the cylinder 44 to bias the piston 42 and the shaft 36 in an opposite axial direction and move the cover 26 to the second position spaced axially from the second opening 20, as shown in FIG. 6. The piston 42 is slidingly received on a pin 50 extending parallel with the shaft 36 to allow axial movement of the piston 42 and the shaft 36, but prevent rotation of the piston 42 and the shaft 36.

Referring again to FIGS. 1 through 6, the valves 12, 18 of the assembly 10 are each provided as disks and pivot between their open and closed positions. The process chamber isolation valve 12 is movable within the housing 16 between an opened position allowing fluid to pass through the first opening 14 and a closed position sealing the first opening 14, and the vacuum pump isolation valve 18 is movable within the housing between an opened position allowing fluid to pass through the second opening 20 and a closed position sealing the second opening. The process chamber isolation valve 12 is shown in a closed position in FIGS. 3 and 4, while the pump isolation valve 18 is shown in a closed position in FIGS. 5 and 6. The valves 12, 18 preferably include air-tight seals, such as o-rings 52, positioned between the valves and the valve seats 22, 24.

Since the valves 12, 18 pivot, they are referred to as pendulum valves. An example of a preferred type of pendulum valve is of the type described in U.S. patent application Ser. No. 09/339,084, entitled "Pendulum valve assembly", the disclosure in that application being incorporated herein in its entirety by reference. That pendulum valve uses a novel, yet simple rotating cam arrangement that precisely controls the rotational and axial movement of the valve between an opened position and a closed position.

The pump isolation valve 18 also preferably uses a novel, yet simple rotating cam arrangement for controlling the rotational and axial movement of the valve between the opened and closed positions. Referring to FIGS. 2 and 6, the valve 18 is connected to a longitudinal shaft 54 by an arm 56 extending radially from the shaft 54. The shaft 54 is mounted within the housing 16 of the assembly 10 so as to be rotatable about its longitudinal axis 58 and movable axially along its longitudinal axis 58. Cam rollers 60 are fixed to the shaft 54, extend radially therefrom and are received in slots 62 in the housing 16, which act as cam surfaces. The cam rollers 60 and cam surfaces 62 cause the valve 18 to rotate in a plane parallel to the second opening 20, between a first angular position equal to the fully open position of the valve, to a second angular position where the valve is substantially aligned with the second opening 20.

When the shaft 54 continues to rotate about its longitudinal axis 58, the cam rollers 60 follow the cam surfaces 62 so that the shaft 54, arm 56 and valve 18 then also move parallel with the shaft axis 58 towards the second opening 20. During the rotational and axial movement of the valve 18, the valve moves between the annular cover 26 and the second opening 20 and then engages the valve seat 22. The cam rollers 60 of the pump isolation valve 18 thus provide a novel, yet simple arrangement for controlling the rotational and axial movement of the valve.

A pneumatic piston 64 is connected to the shaft 54 of the pump isolation valve 18 and slidably contained in a cylinder 66 of the housing 16. A spring 68 is also provided in the cylinder 66 to bias the piston 64 and the shaft 54 and move the pump isolation valve 18 to the closed position engaging the valve seat 22 and sealing the second opening 20, as shown in FIG. 6. A port 70 is provided in the cylinder 66 for receiving pressurized gas to force the piston 64 and the shaft 54 in an opposite direction and move the pump isolation valve 18 to the open position. Accordingly, when pressure is shut off to the system, the valve 18 automatically closes.

As shown in FIGS. 2 and 6, the shaft 54 of the pump isolation valve 18 is tubular and is coaxially received on the shaft 40 of the annular cover 26, so that the shafts move independently of one another. Preferably, the gas receiving ports 46, 70 of both the valve 18 and the cover 26 are connected to a single source of pressurized gas (not shown), so that the single source of pressurized gas can be used to synchronize operation of the valve 18 and the cover 26. In other words, when pressure is applied to the assembly 10, the annular cover 26 moves axially away from the second opening 20 and the valve 18 moves rotationally and axially between the annular cover 26 and the second opening 20 and engages the valve seat 22, as shown best in FIG. 6.

Figure 4:
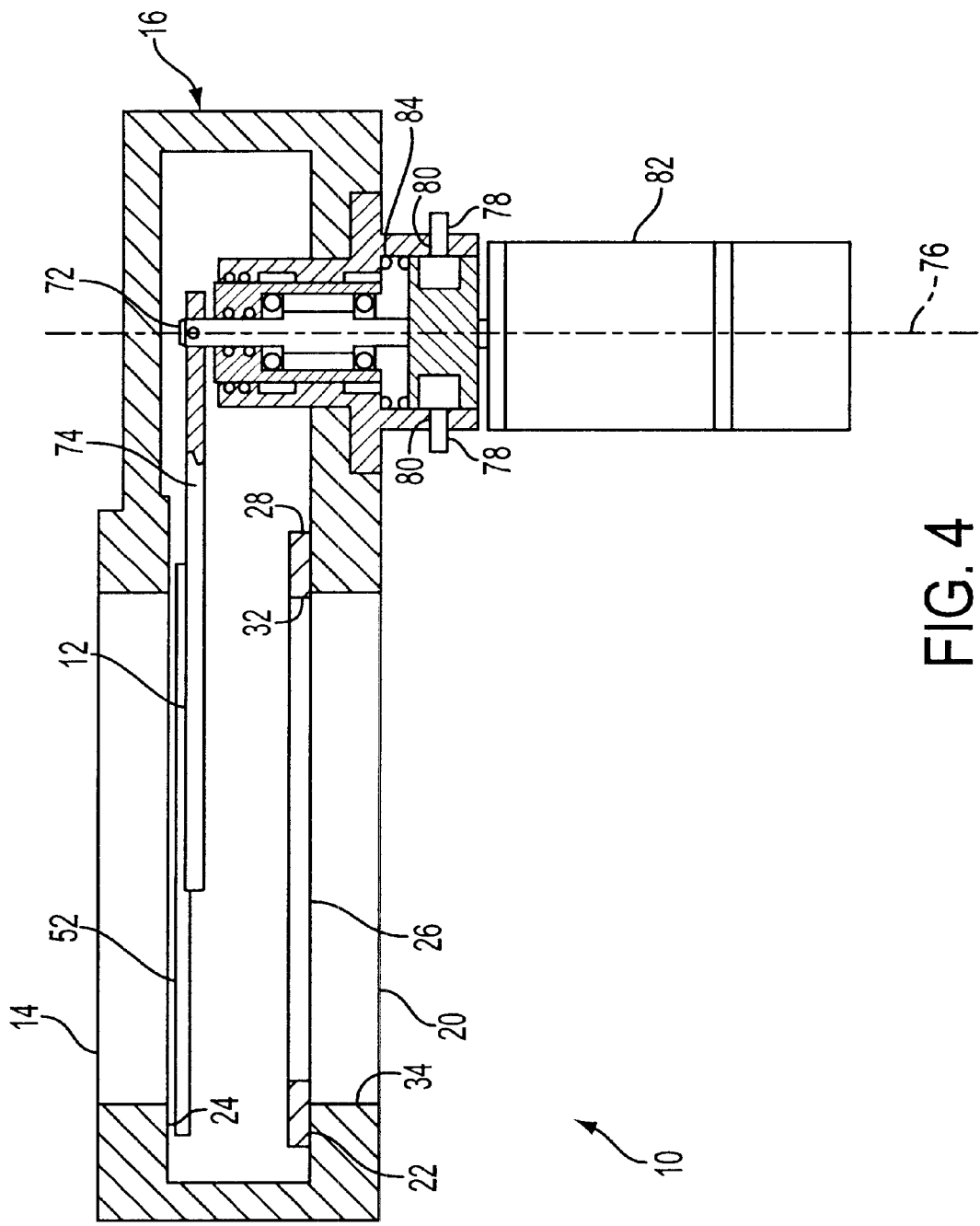
FIG. 4 is a sectional view of the pendulum valve assembly taken along line 4—4 of FIG. 3.
Figure 5:
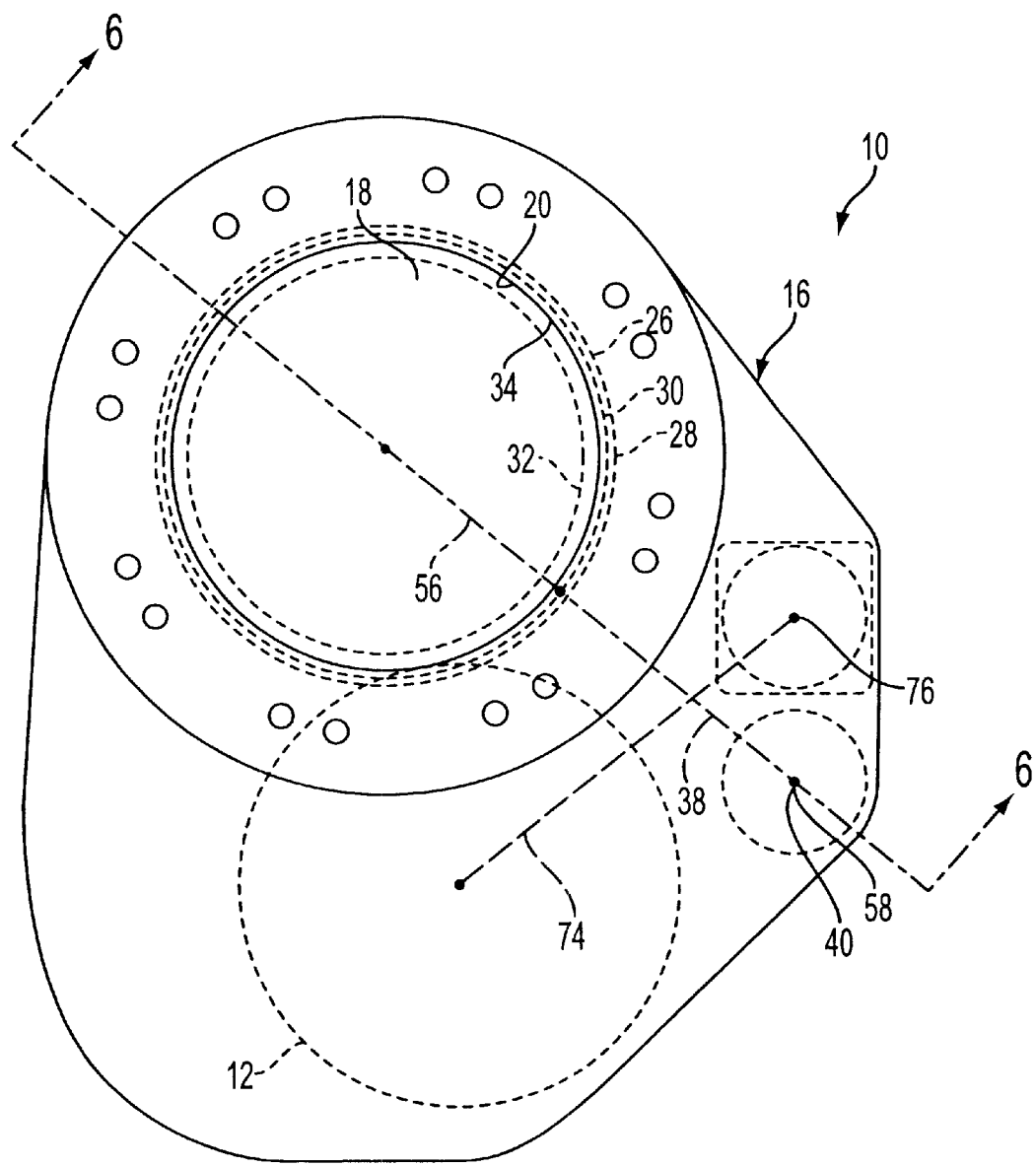
FIG. 5 is a plan view of the pendulum valve assembly of FIG. 1, wherein the other pendulum valve is shown in a closed position.

Referring now to FIG. 4, the process chamber isolation valve 12 is connected to a shaft 72 through an arm 74, and the shaft 72 is mounted within the housing 16 so as to be rotatable about its longitudinal axis 76 and movable axially along its longitudinal axis 76. The shaft 72 is preferably fixedly attached at one end with cam rollers 78 radially extending therefrom, which engage slots 80, defining cam surfaces, in the housing 16.

The cam rollers 78 and the cam surfaces 80 cause the process chamber isolation valve 12 to rotate in a plane parallel to the first opening 14, rotating from a first angular position equal to the open position, to a second angular position where the valve 12 is substantially aligned with the first opening 14. When the shaft 72 continues to rotate, the rollers 78 follow the slots 80 so that the longitudinal shaft 72, arm 74 and valve 12 also move parallel with the shaft axis 76 towards the first opening 14 until the valve engages the valve seat 24.

In order to control the position of the process chamber isolation valve 12, the embodiment of the assembly 10 shown includes a motor 82 operatively connected to an end of the longitudinal shaft 72 of the valve 12. The motor preferably comprises a reversible stepping motor 82. A spring 84 is provided to bias the shaft 72 in an axial direction away from the first opening 14 in order to insure that the valve 12 will come free of the valve seat 24 when the motor 82 is reversed.

It should be appreciated that various changes can be made to the particular embodiment of the dual pendulum valve assembly as described above without departing from the spirit and scope of the present disclosure. For example, while the cam rollers are provided on the shafts of the valves, the arrangement can be reversed with the cam rollers being fixed to the housing and the cam surfaces provided on the shafts. In addition, alternative suitable drive means may be employed in place of the reversible stepping motor and the pneumatic actuators.

Because certain changes may be made in the above embodiment without departing from the spirit and scope of the dual pendulum valve assembly herein disclosed, it is intended that all matter contained in the above description or shown in the accompanying drawings shall be interpreted in an illustrative and not a limiting sense.

What is claimed is:

1. A valve assembly comprising:
   a) a housing including an interior space and a pair of openings through which fluid can enter and exit the interior space;
   b) a first valve body movable within the interior space between an opened position allowing fluid to pass through a first of the openings and a closed position wherein the first valve body seals the first opening;
   c) a second valve body movable within the interior space between an opened position allowing fluid to pass through a second of the openings and a closed position wherein the second valve body seals the second opening; and
   d) an annular cover movable within the interior space between a first position wherein the cover protects a valve seat of the second opening and a second position wherein the cover is spaced from the valve seat such that the second valve body can engage the valve seat and seal the second opening, wherein the annular cover is movable in a parallel direction with respect to an axis of the second opening.

2. A valve assembly according to claim 1, further comprising a shaft coupled to the annular cover, the shaft movable in a parallel direction with respect to the axis of the second opening.

3. A valve assembly according to claim 2, further including an actuator for moving the shaft of the annular cover.

4. A valve assembly according to claim 3, wherein the actuator comprises a pneumatic actuator.

5. A valve assembly according to claim 4, wherein the annular cover is normally biased to the second position and the pneumatic actuator moves the annular cover to the first position.

6. A valve assembly according to claim 5, wherein the shaft of the annular cover is nonrotatable.

7. A valve assembly according to claim 6, wherein an outer periphery of the annular cover is larger than an outer periphery of the second valve body and an inner periphery of the annular cover is smaller than an inner periphery of the second opening.

8. A valve assembly according to claim 7, wherein the second valve body is pivotally movable between a first angular position where the second valve body is in the opened position, and a second angular position where the second valve body is substantially aligned with the second opening but spaced therefrom, and then movable in a parallel direction with respect to the axis of the second opening to the closed position.

9. A valve assembly according to claim 8, further comprising a shaft coupled to the second valve body, the shaft of the second valve body rotatable about an axis of the shaft and movable in a parallel direction with respect to the axis of the second opening.

10. A valve assembly according to claim 9, further including a cam mechanism coupled between the shaft of the second valve body and the housing and arranged so as to control the movement of the shaft of the second valve body in the parallel direction with respect to the axis of the second opening.

11. A valve assembly according to claim 10, wherein the cam mechanism includes:
   a cam surface defined by the housing, and
   a cam follower fixed to the shaft of the second valve body and engaging the cam surface of the housing so as to define the movement of the shaft of the second valve body relative to the housing.

12. A valve assembly according to claim 11, wherein the shaft of the second valve body is coaxially arranged with the shaft of the annular cover.

13. A valve assembly according to claim 12, wherein the second valve body is normally biased to the closed position and the pneumatic actuator moves the second valve body to the open position.

14. A valve assembly according to claim 13, wherein each of the first and the second valve bodies comprise disks.

15. A valve assembly according to claim 14, wherein each of the first and the second disks are provided with o-rings for sealing engagement with the interior of the housing around the openings.

16. A valve assembly comprising:

a housing including an interior space and an opening;

a valve body movable within the interior space between an opened position allowing fluid to pass through the opening and a closed position sealing the opening; and an annular cover movable within the interior space between a first position wherein the cover protects a valve seat of the opening and a second position wherein the cover is spaced from the valve seat such that the valve body can engage the valve seat and seal the opening, wherein the annular cover is movable in a parallel direction with respect to an axis of the opening.

17. A valve assembly comprising:

a housing including an interior space and an opening;

a valve body movable within the interior space between an opened position allowing fluid to pass through the opening and a closed position sealing the opening;

an annular cover movable within the interior space between a first position wherein the cover protects a valve seat of the opening and a second position wherein the cover is spaced from the valve seat such that the valve body can engage the valve seat and seal the opening;

a shaft coupled to the annular cover and axially movable with respect to an axis of said shaft to move the cover between the first and the second positions;

a shaft coupled to the valve body, said shaft rotatable about an axis of said shaft and axially movable with respect to an axis of said shaft to move the valve body between the opened and the closed positions;

a cam mechanism coupled between the shaft of the valve body and the housing for directing the shaft of the valve body in both a rotational and axial direction during movement of the valve body between the opened and the closed positions; and an actuator for moving the shaft of the annular cover and the shaft of the valve body.

18. A valve assembly according to claim 17, wherein:

the annular cover is normally biased to the second position;

the valve body is normally biased to the closed position; and the actuator moves the annular cover to the first position and the valve body to the opened position.

19. A valve assembly according to claim 18, wherein an outer periphery of the annular cover is larger than an outer periphery of the valve body and an inner periphery of the annular cover is smaller than an inner periphery of the opening.

* * * * *